Dec. 19, 1922.
W. M. PAGE.
BEARING GAUGE.
FILED DEC. 15, 1921.
1,439,321.
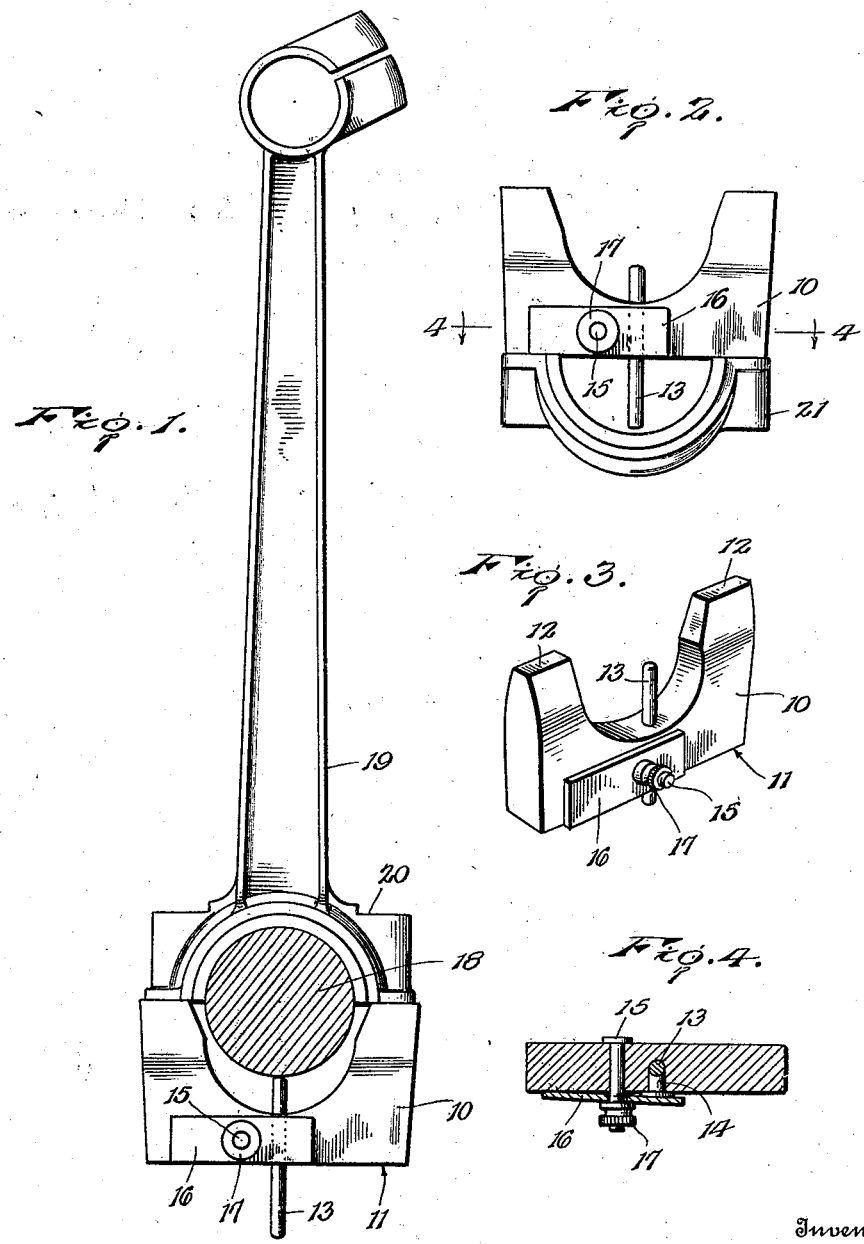
Inventor
W. M. Page.
By
Lacy & Lacy, Attorneys Patented Dec. 19, 1922.

1,439,321

UNITED STATES PATENT OFFICE.

WEBSTER M. PAGE, OF GARLAND, NORTH CAROLINA.

BEARING GAUGE.

Application filed December 15, 1921. Serial No. 522,547.

*To all whom it may concern:*

Be it known that I, WEBSTER M. PAGE, a citizen of the United States, residing at Garland, in the county of Sampson and State of North Carolina, have invented certain new and useful Improvements in Bearing Gauges, of which the following is a specification.

This invention relates to an improved bearing gauge especially designed for use in fitting the connecting rod bearings of internal combustion engines and seeks, as one of its principal objects, to provide a gauge whereby any wear in a crank shaft journal or in the crank shaft bearing of a connecting rod may be readily ascertained and the gauge then used for determining the corresponding necessary adjustment of the bearing.

A further object of the invention is to provide a gauge which may, after the bearing cap of the crank shaft bearing of the connecting rod has been removed, be applied to the exposed end of the bearing of the rod over the crank shaft for measuring the wear in the bearing or in the journal of the shaft and wherein the gauge may then be applied across the ends of the bearing cap for ascertaining the necessary cutting away of the ends of the cap in order that the bearing may properly fit the crank shaft.

A further object of the invention is to provide a gauge employing an integral unitary gauge body for the gauge pin of the device so that the gauge body will support the pin in such manner that accurate and uniform measurements may be taken.

And the invention has as a still further object to provide a gauge wherein the gauge pin will be adjustable upon the gauge body and wherein the pin will be held in adjusted position by spring tension in such manner that abrasion of the pin to possibly result in undue looseness thereof will be overcome.

Other and incidental objects will appear hereinafter.

In the drawing:

Figure 1 is an elevation showing my improved gauge in conjunction with a connecting rod and crank shaft, the bearing cap at the lower end of the rod being removed, Figure 2 is an elevation showing the gauge applied to the bearing cap, Figure 3 is a perspective view illustrating the gauge in detail, and Figure 4 is a section on the line 4—4 of Figure 2, looking in the direction of the arrows.

In carrying the invention into effect, I employ a substantially U-shaped gauge body 10 having a flat edge face 11 while the legs of the gauge body are also provided with flat end faces 12. The gauge body is preferably formed from a single piece of metal and is thus an integral rigid structure, the legs being slightly reduced in thickness at their free end portions. Snugly but slidably fitting through the gauge body at a point midway between the legs thereof is a vertically disposed gauge pin 13 equal in length to the distance between the faces 11 and 12 of the gauge body and coacting with said pin, as shown in Figure 4, is a locking plug 14 freely mounted upon the gauge body at right angles to the pin. This locking plug is preferably formed of some soft metal such as babbitt and the inner end thereof is arranged to frictionally coact with the pin while the outer end of said plug is disposed at one side of the gauge body. Extending transversely through the gauge body adjacent the pin, is a bolt 15 and freely mounted upon this bolt is a resilient clamping plate 16 held by a nut 17 adjustable upon the bolt. At one end, the plate 16 rests against the adjacent side face of the gauge body while at its opposite end the plate overlies the outer end of the plug. Accordingly, as will be seen, by releasing the nut 17 the gauge pin may be adjusted endwise upon the gauge body when, by tightening the nut, the plate 16 will be tensioned against the plug 14 for binding the plug in engagement with the pin and thus locking the pin in adjusted position. By employing a locking plug of soft metal, abrasion of the gauge pin to cause possible looseness thereof will be eliminated while, at the same time, the gauge pin will be firmly held in adjusted position by the plug.

In the drawing, I have, in order to bring out the manner of use of my improved gauge, shown the device in connection with a conventional engine crank shaft 18 and connecting rod 19. At its lower end, the connecting rod is provided with the usual bearing 20 to which is normally secured a bearing cap 21. As is well known, the bearing 20 often becomes worn as does also the journal of the crank shaft, making it necessary to adjust the bearing cap to take up the wear. Heretofore, this has been a more or less inaccurate operation due to the lack of any adequate means for gaging the wear of the connecting rod bearing and the crank shaft journal. As illustrated, the bearing cap is first removed when the flat faces 12 of the legs of the gauge body are positioned flat against the ends of the bearing 20 extending over the crank shaft. The gauge pin 13 is then adjusted to engage at its inner end with the shaft. In this connection, it is pointed out that by providing the legs of the gauge body with the flat faces 12, the gauge will, when applied to the crank shaft bearing, as shown in Figure 1, be caused to assume an accurate position at right angles to the axis of the shaft. Furthermore, since the gauge body is an integral structure, the body will accurately support the pin in a plane cutting the plane of the ends of the bearing at right angles so that when the pin is adjusted to engage the crank shaft, an accurate measurement will be had. Having thus fitted the gauge to the connecting rod bearing and adjusted the gauge pin, the gauge is then, as shown in Figure 2, inverted and the flat face 11 thereof rested upon the ends of the bearing cap 21. Accordingly, by forming the gauge body with said face, the gauge body will be caused to assume an accurate position at right angles to the cap, the gauge pin 13 being supported to extend into the concavity of the cap. The distance between the adjacent end of the pin and the bottom of said concavity will then represent the thickness which must be cut away from the ends of the cap in order that when the cap is again applied to the bearing 20, the bearing will properly fit the journal of the crank shaft. Thus, as will be perceived, the ends of the bearing cap may be accurately cut away the desired amount without the necessity for fitting the cap upon the bearing from time to time as the work progresses while the bearing, when finally taken up, will fit the crank shaft to a nicety.

Having thus described the invention, what is claimed as new is:

1. A bearing gauge including a gauge body having a flat face and provided with spaced legs having flat end faces lying in spaced parallel relation to said face of the body, a gauge pin adjustable through the body and of a length equal to the distance between said face of the body and said faces of the legs, a soft metallic locking stud securing the pin in adjusted position, and yieldable means pressing the stud into frictional engagement with the pin.

2. A bearing gauge including a gauge body having a flat face and provided with spaced legs having flat end faces lying in spaced parallel relation to said face of the body, a gauge pin adjustable through the body and of a length equal to the distance between said face of the body and said faces of the legs, a locking stud coacting with the pin, and a spring tensioned against the stud for normally locking the pin in adjusted position.

3. A bearing gauge including a gauge body having a flat face and provided with spaced legs having flat end faces lying in spaced parallel relation to said face of the body, a gauge pin adjustable through the body and of a length equal to the distance between said face of the body and said faces of the legs, a locking stud coacting with the pin, a spring tensioned against the stud for normally locking the pin in adjusted position, and means for adjusting the tension of said spring.

In testimony whereof I affix my signature.

WEBSTER M. PAGE. [L. S.]